April 27, 1948. F. A. SHOWACRE 2,440,351
DIFFERENTIAL RAILROAD CAR WHEEL AXLE
Filed Oct. 25, 1944 2 Sheets-Sheet 1

Inventor
FRANK A. SHOWACRE
By
Attorney

April 27, 1948. F. A. SHOWACRE 2,440,351
DIFFERENTIAL RAILROAD CAR WHEEL AXLE
Filed Oct. 25, 1944 2 Sheets-Sheet 2
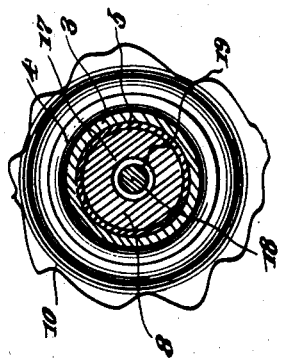
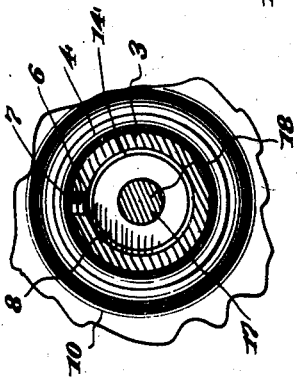
Inventor
FRANK A. SHOWACRE
Attorney Patented Apr. 27, 1948

2,440,351

UNITED STATES PATENT OFFICE 2,440,351

DIFFERENTIAL RAILROAD CAR WHEEL AXLE

Frank A. Showacre, Bethesda, Md.

Application October 25, 1944, Serial No. 560,272

1 Claim. (Cl. 295—37)

This invention relates to axles for railroad car wheels and more particularly to an axle having a differential construction which permits wheels carried by the axle to have rotary motion independent of each other and thus allow the wheels to follow curves in a track without excessive wear upon the rails or flanges of the wheels caused by excessive pressure of a wheel flange against the outer rail at a curve.

Another object of the invention is to provide an axle including wheel-carrying spindles housed in a sleeve which normally turns with the axle sections but allows independent rotation of the axle sections when following a curve in a track or when other conditions make it necessary for one wheel to turn at a different rate of speed than the other.

Another object of the invention is to so form the axle sections that an assembly shaft may be passed through bores formed longitudinally thereof and nuts applied to ends of the shaft to engage outer ends of the axle sections and prevent longitudinal shifting of the axle sections in the sleeve.

Another object of the invention is to provide a sleeve and axle sections of such formation that grease may be fed into the sleeve to lubricate contacting surfaces of the sleeve and sections and serve very effectively to prevent excessive wear when the axle is in use.

Another object of the invention is to provide a differential axle for railroad car wheels which is so constructed that it may be substituted in lieu of axles of conventional formation and mounted in the usual journal boxes of a railroad car truck.

Another object of the invention is to provide a differential axle which is simple in construction, capable of being quickly assembled and readily mounted in journal boxes of a car truck, and also allowing one wheel and the axle section carrying same to be removed for replacement without disturbing the other wheel and axle section.

In the accompanying drawings:

Fig. 6 is a view, on an enlarged scale, showing the differential axle in longitudinal section.

Fig. 7 is a transverse sectional view on the line 7—7 of Fig. 6.

Fig. 8 is a sectional view on the line 8—8 of Fig. 6.

Fig. 9 is a view taken on the line 9—9 of Fig. 6.

Figure 1:
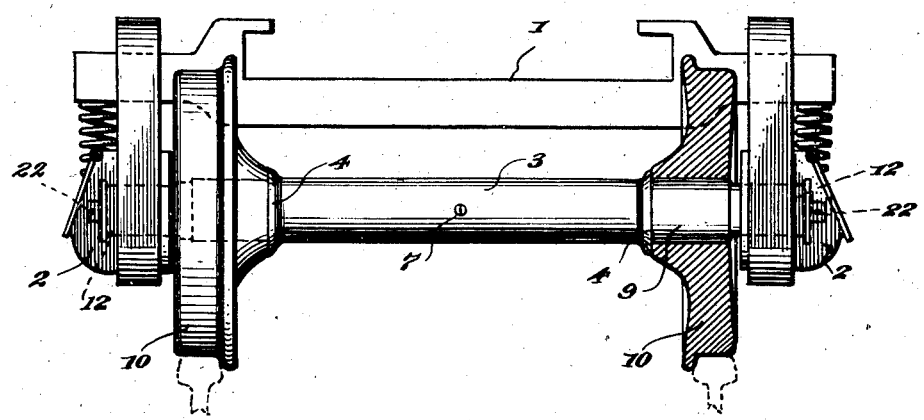
Fig. 1 is a view showing the improved differential axle mounted in journal boxes of a car truck, one wheel being in section.
Figure 2:
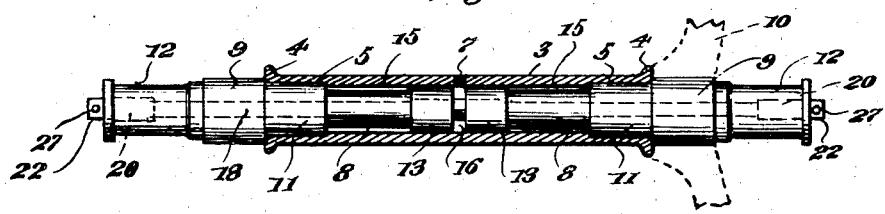
Fig. 2 is a view showing the differential axle with its sleeve in longitudinal section.
Figure 3:
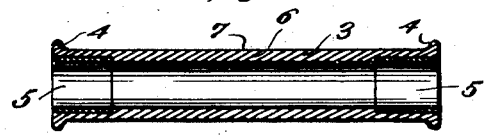
Fig. 3 is a sectional view taken longitudinally through the sleeve.
Figure 4:
Fig. 4 is a view showing the assembly shaft in elevation.
Figure 5:
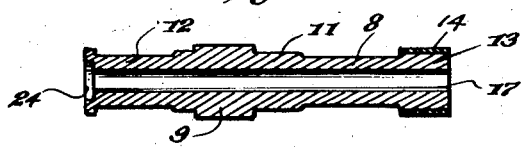
Fig. 5 is a sectional view taken longitudinally through one axle section.

The improved differential axle serves as a mounting for the wheels of a railroad car and, in Fig. 1, there has been shown a conventional representation of a railroad car truck 1 having the usual front and rear journal boxes 2, between which the front and rear axles are rotatably mounted. It will thus be seen that no changes of construction are necessary in order that the improved differential railroad car wheel axle may be used in lieu of those previously used.

This axle has a sleeve 3 formed of strong metal such as steel and having outstanding circumferential flanges 4 about its ends. The sleeve has been shown as provided in opposite end portions with bushings 5 formed of bronze or other suitable metal which have their surfaces flush with the inner surface of the sleeve so that the sleeve will, in effect, be of an even internal diameter throughout its length. Midway its length, the sleeve is formed with an opening 6 whereby lubricant may be introduced and this opening is normally closed by a threaded plug 7.

The axle sections 8 are of duplicate construction and each is formed in spaced relation to its outer end with an enlargement 9 upon which a wheel 10 is rigidly mounted, the wheel having a drive fit on the enlargement so that the wheel and the axle section carrying same turn as a unit. Inwardly of the enlargement 8 each axle section is formed with an elongated shoulder 11 of the same length as the bushing 5 and this shoulder fits snugly within the bushing when the axle section is in place within the sleeve. Inner and outer sides of the wheel hubs terminate flush with ends of the enlargements and, at their inner ends, the hubs have abutting engagement with the flanged ends of the sleeve. Protruding outer end portions of the axle sections are shaped to form journals 12 which are of conventional shape for reception in the journal boxes 2 to rotatably mount the axle and permit rotation of the axle as a unit or rotation of each axle section 8 independent of and relative to the sleeve and the other axle section. The inner end portion of each axle section is enlarged externally to form an enlargement 13 which is covered by a bronze bushing sleeve 14 and fits snugly within the sleeve 3. Since the enlargements 11 and 13 are spaced from each other longitudinally of the axle sections, frictional binding between the axle sections and the sleeve will be reduced to a minimum and spaces 15 formed in the sleeve about the axle sections to receive lubricant forced into the space 16 between inner ends of the axle sections when the plug 7 is removed.

The axle sections are each formed with a longitudinal bore 17 to receive a locking shaft 18 which has its intermediate portion 19 and its end portions 20 enlarged so that they fit snugly within the bores of the axle sections. Ends of the shaft protrude from outer ends of the axle sections and are formed with terminals 21 upon which nuts 22 are applied, the nuts having flanges 23 at their inner ends for engaging in seats 24 formed at outer ends of the axle sections so that when the nuts are tightened, the axle sections will be held against longitudinal shifting outwardly of the sleeve. Openings 25 and 26 are formed through the terminals 21 and the nuts to receive tapered locking pins 27 which prevent loosening of the nuts, and opposed portions of the nuts are formed with flat wrench-engaging faces 28 so that the nuts may be applied and readily tightened.

An axle of the improved construction can be easily and very quickly assembled as it is merely necessary to slide sections 8 into the sleeve through opposite ends thereof and then pass the shaft 18 through the bores of the axle sections and apply the securing nuts. When the nuts are applied the axle sections will be confined between the nuts and the ends of the sleeve and this will cause the wheels and axle sections to be end-thrusted by inner and outer members serving as thrust bearings. It should also be noted that the sleeve is of predetermined length and of such length that when the shaft sections are thrust into the sleeve, the wheels which are shrunken into place about the enlargements 9 will be held in proper spaced relation to each other and conform to the gauge of a railway track upon which the wheels are to roll. The fact that the inner ends of the axle sections are spaced from each other insures abutting engagement of the wheels and the enlarged portions of the axle sections with the ends of the sleeve and also provides the spaces 16 to receive a supply of lubricant for the axle.

Having thus described the invention, what is claimed is:

A differential railroad car axle comprising a freely rotatable sleeve, axle sections rotatable in said sleeve independent of each other and being inserted and removable through ends of the sleeve, said axle sections having outer end portions projecting from ends of the sleeve and terminating in journals for rotatable reception in journal boxes of a railroad car truck, wheels fixed about protruding portions of said axle sections between the journals and ends of said sleeve, said axle sections having longitudinal bores and annular seats at their outer ends surrounding the bores, a locking shaft extending through the bores and having its ends protruding from outer ends of the axle sections and threaded, and nuts upon the threaded ends of said shaft having flanged inner ends engaged in said seats to hold the axle sections against outward shifting.

FRANK A. SHOWACRE.

REFERENCES CITED

The following references are of record in the file of this patent:

UNITED STATES PATENTS

| Number | Name | Date |
| --- | --- | --- |
| 134,247 | Braymer et al. | Dec. 24, 1872 |
| 319,369 | Wilkinson | June 2, 1885 |
| 760,505 | Wilcox | May 24, 1904 |